United States Patent [19]

Kraus

[11] Patent Number: 5,454,479
[45] Date of Patent: Oct. 3, 1995

[54] CLOSURE COVER

[75] Inventor: Willibald Kraus, Grunstadt, Germany

[73] Assignee: TRW United Carr GmbH & Co. KG, Enkenbach-Alsenborn, Germany

[21] Appl. No.: 162,459

[22] Filed: Dec. 3, 1993

[30] Foreign Application Priority Data

Dec. 14, 1992 [DE] Germany .................. 42 42 154.3

[51] Int. Cl.⁶ .................................................. B65D 39/00
[52] U.S. Cl. .................. 220/307; 220/287; 215/355; 215/DIG. 1; 217/110
[58] Field of Search ................... 220/287, 307, 220/DIG. 19; 215/355, 358, DIG. 1; 296/208, 1.1; 52/743, 514, 514.5, 517; 217/110

[56] References Cited

U.S. PATENT DOCUMENTS

| | | | |
|---|---|---|---|
| 3,262,599 | 7/1966 | Muller | 220/307 |
| 4,334,632 | 6/1982 | Watanabe | 220/307 |
| 4,761,319 | 8/1988 | Kraus et al. | |
| 5,037,326 | 8/1991 | Reedy | |
| 5,171,304 | 12/1992 | Ris et al. | 215/358 X |
| 5,267,667 | 12/1993 | Cozzani | 220/307 |

FOREIGN PATENT DOCUMENTS

| | | | |
|---|---|---|---|
| 534877 | 3/1993 | European Pat. Off. | 220/307 |
| 1102036 | 3/1961 | Germany | 217/110 |

Primary Examiner—Allan N. Shoap
Assistant Examiner—Stephen Cronin
Attorney, Agent, or Firm—Fay, Sharpe, Beall, Fagan, Minnich & McKee

[57] ABSTRACT

A plastic closure cover for closing a collet opening in the body of a motor vehicle comprises a dish-shaped part 2 including a bottom 3 and a cylindrical side wall 4 whose outer surface is equipped with contact elements 5. The contact elements are designed as obliquely arranged wings 6 that extend at least over part of the surface at an acute angle to radial lines of the side wall 4.

16 Claims, 2 Drawing Sheets

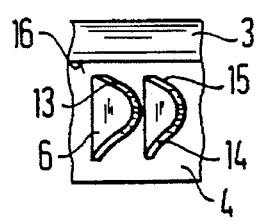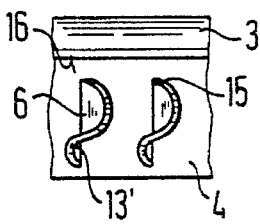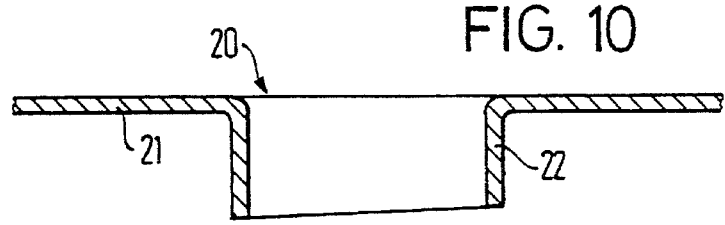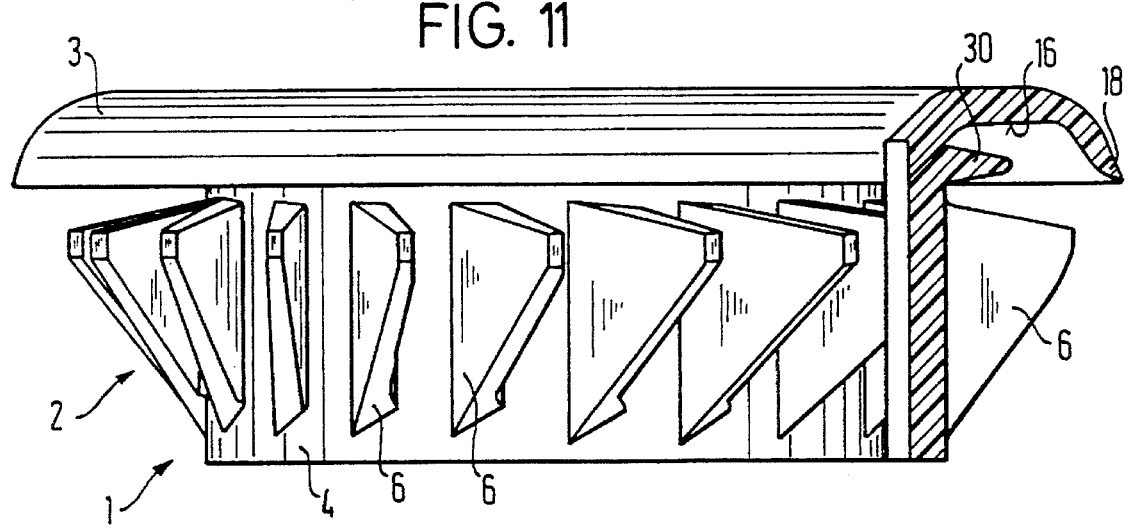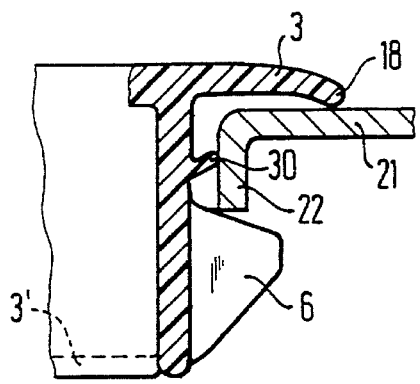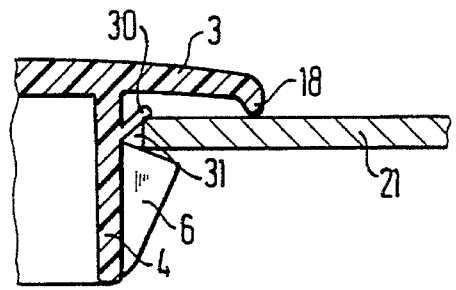

CLOSURE COVER

BACKGROUND OF THE INVENTION

The subject invention is directed to a closure cover made of plastic and specifically intended for closing a collet opening in a motor vehicle body. The cover generally comprises a bowl-shaped part with a bottom and a cylindrical casing-shaped wall whose exterior is equipped with contact surfaces.

A closure cover of this general type is already known in the art (see, for example, U.S. Pat. No. 4,760,935). The closure cover of this patent is designed in such manner that a circumferential stop ring serves as the contact element. Other known closure covers exhibit ring shoulder segments, individual holding claws, and slotted wall areas. (See, for example, German Patent No. 1,555,007; German Utility Model No. 69 33 117; French Patent No. 1,216,812; German Utility Model No. 19 59 426; German Printed Specification No. 15 25 790; U.S. Pat. No. 4,938,378; and, German Printed Publication No. 35 12 582 A1 of 16 Oct. 1986.)

It is the object of the invention to improve such known closure covers in a manner that they are specifically suitable for sealing a collet opening and so that they will afford, in addition to excellent sealing, a reliable fastening and a high degree of tolerance compensation.

The task is solved according to the subject invention by forming the contact elements as obliquely arranged wings that extend at least over part of the wall area at an acute angle relative to the radial lines of the cylindrical casing-shaped wall.

The obliquely arranged, flexible wings beneficially produce excellent holding of the closing lid within a collet opening. A portion of the wings position themselves at the inner circumference of the collet opening and a portion engage behind its exterior edge. Thus, there is afforded, aside from excellent sealing, secure holding and improved tolerance compensation.

In a further refinement of the invention, the wings can have a triangular shape with one side of the triangle as an interior end region connected with the exterior surface of the cylindrical casing-shaped wall. The opposing corner of the triangle forms the exterior end region. In such an arrangement, the exterior end region of a wing can lie in the same radial plane of the cylindrical casing-shaped wall as the inner end region of an adjacent wing so that the individual obliquely extending flexible wings have a somewhat overlapped relationship.

According to a further characteristic of the invention, the wings can have a tapered configuration such that an inner surface and an outer surface of each wing extend conically toward one another. In such an arrangement, the largest thickness distance between the inner and outer wing surfaces may be in the interior end region of the wing at the point where it joins to the cylindrical casing-shaped wall.

It is also possible that the inner and outer surfaces of the wings may be generally flat and parallel. Alternatively, the inner and outer surfaces may have a curved configuration such as concave and convex, respectively.

Moreover, the wings may be arranged over the entire exterior circumference of the cylindrical casing-shaped wall so as to extend obliquely in the same direction. Alternatively, it is possible that, as a variation, the wings may be arranged in pairs inclined toward one another or that various groups of adjacent wings may be inclined in the same direction but opposite that of the wings in an adjacent group.

It is also possible that the respective wings may be shaped in the form of a dish or shovel. Likewise, the possibility exists that the outer peripheral contour of each wing can be designed as a curved line with a relatively gradual, flat ascent and a steep conclusion portion with the steep conclusion portion facing the underside of the bottom to provide an improved sealing effect of the closure cover. Alternatively, the outer peripheral contour of each wing may be designed in the form of a "S".

BRIEF DESCRIPTION OF THE DRAWINGS

The above and other objects and advantages of the invention will become apparent from the following description when read in conjunction with the accompanying drawings wherein:

FIGS. 8 and 9 are partial side elevational views showing alternative forms for the outer peripheral contour of the wings;

FIG. 10 is a cross-sectional elevational view taken through a support panel with a collet opening formed therein;

FIG. 11 is a side elevational view, partially in section, showing another form of closure cover according to the invention; and, FIGS. 12 and 13 are partial cross-sectional elevational views showing two different installation possibilities for closure covers formed in accordance with the invention.

DETAILED DESCRIPTION OF THE PREFERRED EMBODIMENTS

Figure 1:
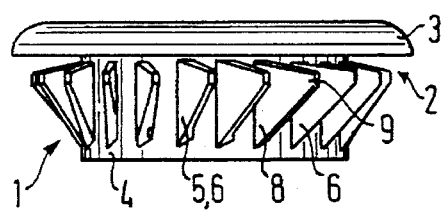
FIG. 1 is a side elevational view of a closure cover formed in accordance with the invention.
Figure 2:
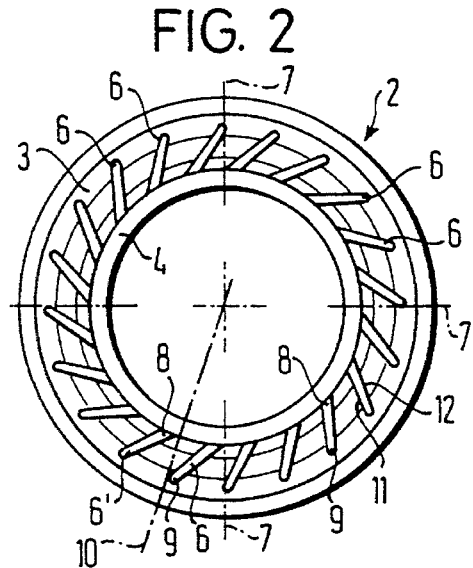
FIG. 2 is a bottom view of the closure cover of FIG. 1.
Figure 3:
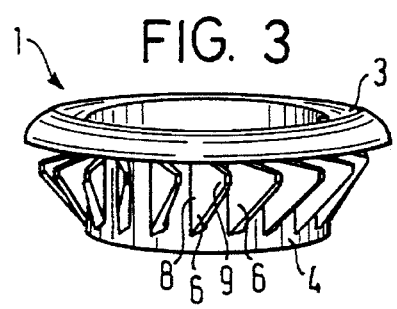
FIG. 3 is a perspective view of the closure cover of FIGS. 1 and 2.

Referring more particularly to the drawings wherein the showings are for the purpose of illustrating preferred embodiments of the invention only and not for the purpose of limiting same, FIGS. 1 through 3 illustrate a closure cover i which is preferably molded of plastics material and which is used specifically for sealing a collet opening such as opening 20 illustrated in FIG. 10. The collet opening shown in FIG. 10 is formed in a support panel or element 21 and has a circumferential, axially extending flange 22. The circumferential flange 22 illustrates, within permissible tolerance ranges, varying heights so that the closure cover according to the invention should be designed in a manner to compensate for such varying heights.

Referring more specifically to the closure cover shown in FIGS. 1 through 3, it will be seen that it generally comprises a dish-shaped body part 2 which includes a transversely extending bottom wall 3 and a cylindrical casing-shaped side wall 4. At the outer surface of the cylindrical casing-shaped wall 4, there are contact or engagement elements 5.

As can be seen from FIGS. 1 through 3, the contact elements 5 are designed as obliquely arranged wings 6. According to FIG. 2, the wings 6 preferably extend at an acute angle relative to the radial lines 7 of the casing-shaped wall 4.

It is further apparent from FIGS. 1 and 3 that each of the wings 6 is designed with a triangular peripheral shape. One side of the triangle is connected as an inner end region 8 with the outer surface of the cylindrical casing-shaped wall 4. The opposing corner of the triangle forms an outer end region 9. In order to guarantee the best possible holding effect of the closure cover 1 in the collet opening 20, the invention proposes that there may be provided at the outer surface of the cylindrical casing-shaped wall a large number of the obliquely arranged wings 6. In such an arrangement, the outer end region 9 of each wing 6 (see FIG. 2) may be positioned in the same radial plane 10 of the cylindrical casing-shaped surface 4 as the inner end region of a preselected adjacent wing 6'. In this manner, the wings are, in effect, somewhat overlapping in their general arrangement.

It is apparent from FIG. 2 that each wing 6 or 6' exhibits an inner surface 11 and outer surface 12 that extend conically toward each other. Thus, the wings taper in thickness. In the preferred form, the greatest distance between the inner and outer surface 11, 12, respectively, is at the inner end region 8. Consequently, the individual wings are overall relatively stable, but highly flexible. In this embodiment, the inner and outer surfaces 11, 12 are generally flat and smooth.

Figure 4:
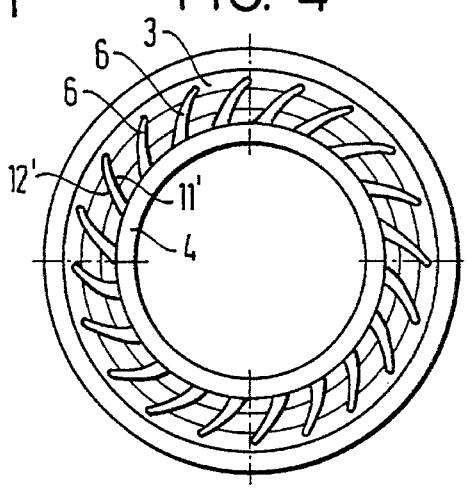
FIGS. 4 through 7 are bottom views of alternative forms of closure covers formed in accordance with the invention.

In the embodiment shown in FIG. 4, there are again employed a number of individual wings 6 that have inner and outer surfaces 11' and 12'. In this embodiment, however, the inner surface 11' is concave and the outer surface is convex so that the wings have a curved configuration. Here, again, the construction is such that the outer end region of each wing is positioned generally in the same radial plane of the cylindrical casing-shaped wall 4 as the inner end region of a preselected adjacent wing.

Figure 5:
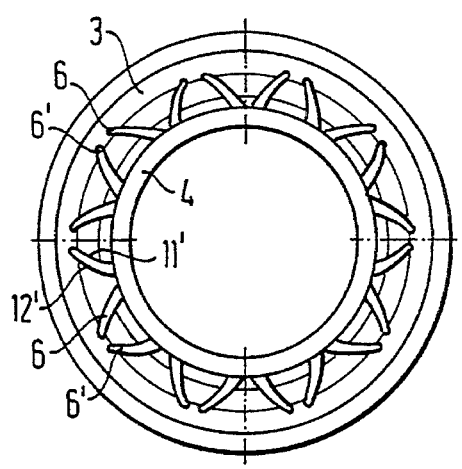

In the embodiments according to FIGS. 1 to 4, the individual wings are arranged to extend obliquely in one direction over the entire exterior circumference of the casing-shaped wall 4. According to the embodiment illustrated in FIG. 5, it is possible to have wings in sets that are respectively inclined toward one another so that there is produced a type of star-shaped arrangement. In this embodiment, the individual wings, in turn, have the curved inner and outer surfaces as described with respect to the FIG. 4 embodiment.

Figure 6:
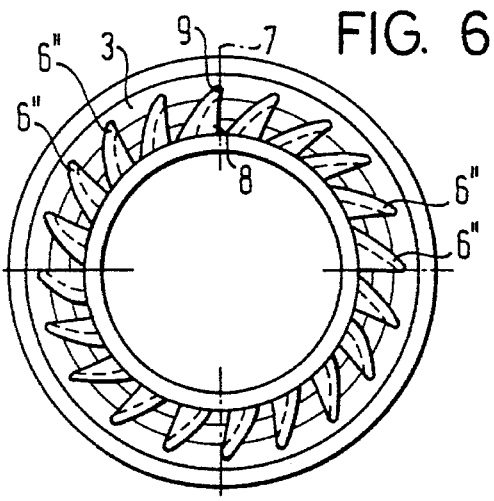

In the embodiment according to FIG. 6, the wings 6" are respectively designed to have a somewhat dish configuration so that there is produced, in effect, a type of shovel-shape wing structure. Again, the outer surfaces and the inner surfaces of wings 6" are respectively convex and concave, and the wings 6" are shown as being inclined in only in one direction. However, it is entirely possible to have the wings of the FIG. 6 embodiment inclined in the manner discussed with reference to the FIG. 5 embodiment.

Figure 7:
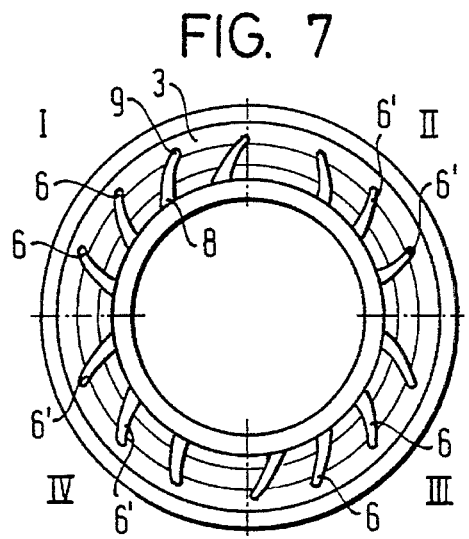

In the embodiment according to FIG. 7, the wings 6 are arranged in groups. The groups in the FIG. 7 embodiment are divided into quadrants I, II, III, IV of the cylindrical casing-shaped wall 4. In each of the groups, the wings are inclined in a different direction than the wings of the group in the neighboring quadrant. It should, of course, be understood that instead of dividing the wings into four groups and quadrants, it is possible that they can be subdivided into other segments and to provide in such arrangements wings 6 or 6' respectively inclined in another way or to combine the embodiments of FIGS. 6 and 7. That is to say, to change, according to the quadrant, the inclination of the dish-shaped wings 6".

While the embodiments according to FIGS. 1 to 7 have the individual wings either in the form of a shovel or a triangle, the FIG. 8 embodiment has the wings 6 so that their outer peripheral edges have the contour 13 shaped as a curved line with a relatively flat ascending portion 14 and a steep concluding or declining portion 15. In this arrangement, the steep concluding portion is shown as beneficially facing the underside 16 of the bottom wall 3. The underside 16 of bottom wall 3 may be provided with a sealing lip 18 located to rest upon the surface of support 21, illustrated in FIG. 10, so that additional sealing effect is obtained.

According to FIG. 9, there also exists the possibility that the outer contour 13' of each wing 6 may be designed in the shape of an "S". Thus, again, the steep concluding portion 15 is arranged to face the underside 16 of bottom 3.

As can be seen from the foregoing, there is produced by the present invention a closure cover made of plastic which is particularly suited for closing a collet opening in a motor vehicle body.

As illustrated in FIG. 11, it is also possible that a circumferentially continuous, radially extending sealing lip 30 can be located between the underside 16 of bottom wall 3 and the wings 6. The sealing lip 30 can, for example, have a triangular cross-sectional shape and can be arranged at the outer circumference of the cylindrical casing-shaped wall 4. As illustrated in FIG. 12, if the closure cover is installed in a collet opening having a circumferential flange 22, the sealing lip 30 can position itself against the inner circumference of the flange 22 and thus produce, together with sealing lip 18, an excellent sealing effect.

As discussed above, the invention is not limited only to installation in a collet opening 20, but, according to FIG. 13, there are also exists the possibility of installing the closure cover made according to the invention in a bore hole 32 of a support 21. As is apparent in FIG. 13, the sealing lip 30 positions itself against the upper edge of the bore hole 31. Here, again, there is produced in cooperation with sealing lip 18 of bottom wall 3, an extremely good sealing effect. Moreover, the sealing lip 30 acts to produce excellent centering of the closure cover in the bore hole 31 or the collet opening 20. As can be readily understood, the sealing lip 30 does not need to have a triangular shape in cross section, but it is also possible, although not illustrated, that the sealing lip could have, for example, the shape of an arch or of an attachment at the underside 16 of bottom wall 3. In such case, the sealing lip may also extend downward into the corresponding aperture, i.e., the collet opening 20 or the bore hole 31. The bottom wall 3 may also be positioned at the opposite side of the closure cover 1 while sealing lips 18 and 20 remain in the same place. FIG. 12 illustrates with dotted lines the possibility of bottom wall 3' being located at the opposite end of the closure cover.

As a result of the specific design of the contact elements as obliquely arranged rings 6, 6', or 6", there is produced, in addition to excellent holding, a significantly improved sealing effect. Moreover, the design achieves very satisfactory tolerance compensation, even when the circumferential area of the collet opening 20 exhibits differing heights.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic closure cover intended for closing an opening in a motor vehicle body, the cover having a dish-shaped portion comprised of a bottom wall and a cylindrical casing-shaped wall joined to and extending from the bottom wall, the cylindrical casing-shaped wall having a radially facing outer surface carrying a plurality of contact elements, characterized in that the contact elements (5) are flexible wings (6) that are obliquely arranged and extend, at least over part of the outer surface, at an acute angle relative to radial planes of the cylindrical casing-shaped wall (4).

2. A closure cover according to claim 1 wherein the wings (6) have a triangular shape with one side of the triangle constituting an inner end region (8) connected with the outer surface of the cylindrical casing-shaped wall (4) and an opposite corner of the triangular shape forming an outer end region (9).

3. A closure cover according to claim 1 wherein each wing (6) has an outer end region (9) and an inner end region (8) with the inner end region (8) connected to the casing-shaped wall (4) and with the outer end region (3) positioned in the same radial plane (10) of the cylindrical casing-shaped wall (4) as the inner end region of an adjacent wing (6').

4. A closure cover according to claim 1 wherein at least some of the wings (6, 6') have an inner surface (11) and an outer surface (12) that extend conically relative to each other.

5. A closure cover according to claim 4 wherein the largest distance between the inner surface (11) and the outer surface (12) is in the inner end region (8) connected to the casing-shaped wall (4).

6. A closure cover according to claim 4 wherein the inner and outer surfaces (11, 12) of the wings (6) are flat.

7. A closure cover according to claim 4 wherein the inner and outer surfaces (11', 12') of the wings (6) are curved.

8. A closure cover according to claim 1 wherein the wings (6, 6') extend obliquely in one direction over the entire exterior circumference of the cylindrical casing-shaped wall (4).

9. A closure cover according to claim 1 wherein adjacent pairs of the wings (6) extend obliquely toward each other.

10. A closure cover according to claim 1 wherein there are respective groups of the wings (6) with the wings (6) in one group inclined in a different direction than the wings (6) of an adjacent group.

11. A closure cover according to claim 1 wherein the wings (6") have a dish-shape.

12. A closure cover according to claim 1 wherein the outer peripheral contour (13) of each of the wings (6, 6', 6") is designed as a curved line with a flat ascent (14) and a steep conclusion (15).

13. A closure cover according to claim 12 wherein the steep conclusion (15) faces the underside (16) of the bottom wall (3).

14. A closure cover according to claim 1 wherein the outer peripheral contour (13') of each of the wings (6) is in the shape of an "S".

15. A closure cover according to claim 1 wherein between the underside (16) of the bottom (3) and the wings (6) there is located a circumferentially extending sealing lip (30).

16. A closure cover according to claim 15 wherein the sealing lip (30) is located on the exterior of the cylindrical casing-shaped wall (4).

* * * * *